United States Patent
Walenty et al.

(10) Patent No.: US 6,859,712 B2
(45) Date of Patent: Feb. 22, 2005

(54) ADAPTIVE COMPENSATION METHOD FOR AN ANTI-LOCK BRAKE CONTROL

(75) Inventors: Allen John Walenty, Macomb, MI (US); Kevin Gerard Leppek, Rochester Hills, MI (US); David Alan Thatcher, Troy, MI (US)

(73) Assignee: General Motors Corporation, Detroit, MI (US)

(*) Notice: Subject to any disclaimer, the term of this patent is extended or adjusted under 35 U.S.C. 154(b) by 171 days.

(21) Appl. No.: 09/943,308

(22) Filed: Aug. 31, 2001

(65) Prior Publication Data

US 2003/0045989 A1 Mar. 6, 2003

(51) Int. Cl.⁷ .......................... B60T 8/60; B60T 13/66; B60T 8/64
(52) U.S. Cl. .......................... 701/71; 701/80; 303/189
(58) Field of Search .............................. 701/70, 71, 80; 303/189, 141, 122.01, 115.4, 116.1, 122.08, DIG. 3, DIG. 4; 340/453; 180/197

(56) References Cited

U.S. PATENT DOCUMENTS

| | | | | |
|---|---|---|---|---|
| 3,844,385 A | * | 10/1974 | Szekely | 188/70 B |
| 4,685,745 A | * | 8/1987 | Reinecke | 303/100 |
| 4,708,406 A | * | 11/1987 | Takagi et al. | 303/115 |
| 4,800,991 A | * | 1/1989 | Miller | 188/1.11 L |
| 5,039,175 A | * | 8/1991 | Holzmann et al. | 303/92 |
| 5,043,896 A | * | 8/1991 | Sol | 364/426.02 |
| 5,125,723 A | * | 6/1992 | Sakuma et al. | 303/156 |
| 5,299,452 A | * | 4/1994 | Caron et al. | 73/129 |
| 5,467,645 A | * | 11/1995 | Skorupski et al. | 73/121 |
| 5,470,134 A | * | 11/1995 | Toepfer et al. | 303/9.61 |
| 5,505,527 A | * | 4/1996 | Gray, Jr. et al. | 303/3 |
| 5,613,744 A | * | 3/1997 | Eslinger et al. | 303/191 |
| 5,681,992 A | * | 10/1997 | Klein et al. | 73/121 |
| 6,119,059 A | * | 9/2000 | Tai et al. | 701/29 |
| 6,135,578 A | * | 10/2000 | Clar et al. | 303/114.3 |
| 6,158,822 A | * | 12/2000 | Shirai et al. | 303/3 |
| 6,275,763 B1 | * | 8/2001 | Lotito et al. | 701/71 |
| 6,332,354 B1 | * | 12/2001 | Lalor et al. | 73/121 |
| 6,460,943 B1 | * | 10/2002 | Toepfer et al. | 303/155 |

* cited by examiner

*Primary Examiner*—Tan Q. Nguyen
*Assistant Examiner*—Dalena Tran
(74) *Attorney, Agent, or Firm*—Christopher DeVries

(57) ABSTRACT

An improved anti-lock control method for a vehicle brake system identifies various factors that degrade the effectiveness of the brake system and adaptively adjusts a brake apply rate during anti-lock brake control to compensate for the identified degradation so that the optimal tractive force during anti-lock brake control is more nearly realized. The identified factors include fading due to brake heating, hydraulic leakage, mis-adjusted and non-releasing rear brakes, brake wear and excessive vehicle weight.

6 Claims, 8 Drawing Sheets

ADAPTIVE COMPENSATION METHOD FOR AN ANTI-LOCK BRAKE CONTROL

TECHNICAL FIELD

This invention relates to motor vehicle anti-lock brake systems, and more particularly to a control method that adaptively adjusts an anti-lock brake pressure apply rate to compensate for a detected degradation of braking effectiveness.

BACKGROUND OF THE INVENTION

A motor vehicle anti-lock braking system (referred to herein as an ABS system) repeatedly releases and re-applies hydraulic brake pressures during conditions of wheel lock with the objective of maximizing the tractive force between the vehicle tires and the road surface. However, the control strategies assume that the brake system is operating normally, and the system performs at a sub-optimal level when the braking effectiveness is degraded due to fluid leakage, fading, poor adjustment, wear, and so forth. Accordingly, what is needed is an anti-lock brake control method that adaptively compensates for degraded braking effectiveness.

SUMMARY OF THE INVENTION

The present invention is directed to an improved anti-lock control method for a vehicle brake system, wherein various factors that degrade the effectiveness of the brake system are identified and used to adaptively determine a brake apply rate during anti-lock brake control. In the illustrated embodiment, the identified factors include fading due to brake heating, hydraulic leakage, mis-adjusted and non-releasing rear brakes, brake wear and excessive vehicle weight, and the adaptively-determined brake apply rate compensates for the identified brake system degradation so that the optimal tractive force during anti-lock brake control is more nearly realized.

DESCRIPTION OF THE PREFERRED EMBODIMENT

Figure 1:
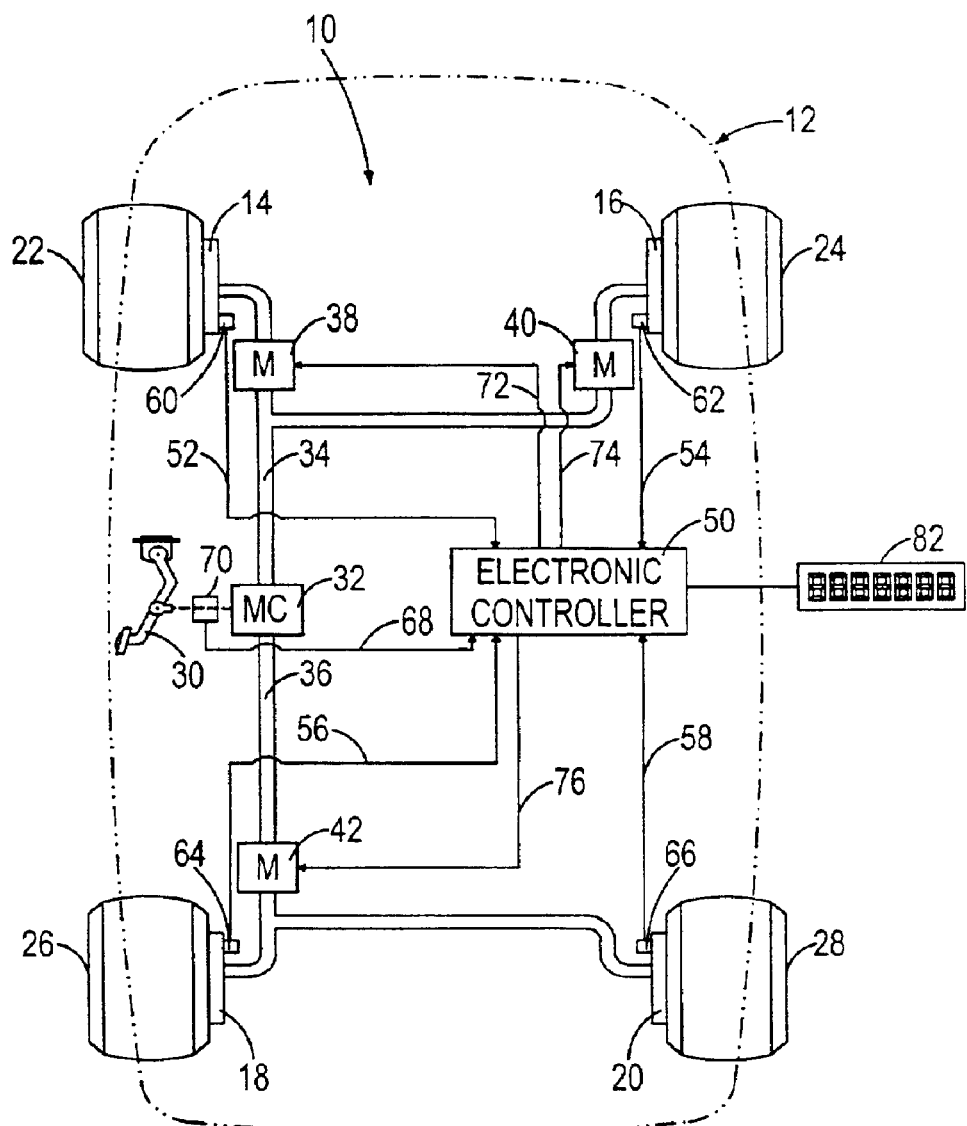
FIG. 1 is a schematic diagram of a vehicle braking system, including a brake pedal position sensor, and a microprocessor-based control unit programmed to carry out the control method of this invention.

Referring to FIG. 1, the present invention is disclosed in the context of an anti-lock braking system 10 for a vehicle 12 having hydraulically activated friction brakes 14, 16, 18, 20 at each of four vehicle wheels 22, 24, 26, 28. In mechanizations where the rear brakes 18, 20 are drum brakes, a self-adjusting mechanism (not shown) is included to compensate for brake shoe wear during braking while the vehicle 12 is backing up. A driver-manipulated brake pedal 30 is mechanically coupled to a master cylinder (MC) 32 for producing hydraulic pressure in proportion to the force applied to pedal 30. Master cylinder 32, which may include a pneumatic booster (not shown), proportions the hydraulic pressure between front and rear brake supply lines 34 and 36 in a conventional manner. Front supply line 34 is coupled to the left front service brake 14 via left-front anti-lock modulator (M) 38, and to the right front service brake 16 via right-front anti-lock modulator (M) 40. Rear supply line 36 is coupled to the left and right rear wheel brakes 18, 20 via rear anti-lock modulator (M) 42.

A microprocessor-based control unit 50 receives various inputs, including wheel speed signals on lines 52, 54, 56, 58 from respective wheel speed sensors 60, 62, 64, 66 and a brake pedal position signal PP on line 68 from pedal position sensor 70. The sensors 60, 62, 64 66 and 70 may be implemented with conventional devices in a manner known to those skilled in the art. In response to the various inputs, the control unit 50 outputs modulator control signals on lines 72, 74, 76 during wheel lock-up conditions, and diagnostic information signals on line 80 for display on a driver information device 82.

In general, the control unit 50 monitors the measured wheel speeds to detect a condition of insipient wheel lock, and then controls modulators 38, 40, 42 to effect a rapid initial reduction in the respective brake pressures for essentially eliminating wheel slip, and then to repeatedly release and re-apply the respective brake pressures with the objective of maximizing the tractive force between the vehicle tires and the road surface. Of course, the optimal values of anti-lock control parameters such as the pressure apply rate vary with the effectiveness of the braking system 10. Ordinarily, however, anti-lock brake control systems assume nominal braking system effectiveness, and the braking performance is degraded to the extent that the assumption is wrong. For example, if the brakes are exhibiting fading due to heating, less brake torque will result for a given brake pressure command. Thus, the performance of the anti-lock control could be improved if the braking system characteristics were known. For example, if the brakes are exhibiting fading, the pressure apply rate during wheel lock conditions could be increased to compensate for the fading and more nearly realize the optimal tractive force. This issue is addressed by the present invention, which identifies various factors that degrade the effectiveness of the brake system 10 and adaptively adjusts the pressure apply rate during anti-lock brake control so as to compensate for the identified factors. In the illustrated embodiment, the identified factors include fading due to brake heating, hydraulic leakage, mis-adjusted and non-releasing rear brakes, brake wear and excessive vehicle weight.

In the illustrated embodiment, the braking system degradation factors are identified by determining a base or calibration relationship between brake pedal position and vehicle deceleration for defined vehicle braking operation, periodically determining a current relationship, and comparing the current and calibration relationships.

Figure 2:
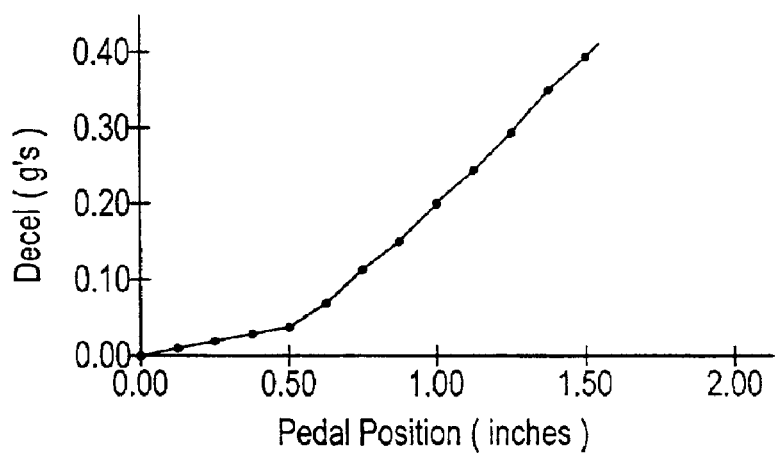
FIG. 2 is a graph depicting vehicle deceleration as a function of brake pedal position for the braking system of FIG. 1.

FIG. 2 graphically depicts a representative relationship between vehicle deceleration and brake pedal position for defined braking of the vehicle 12, assuming that there is no lock-up condition and the modulators 38, 40, 42 are inactive.

Figure 3:
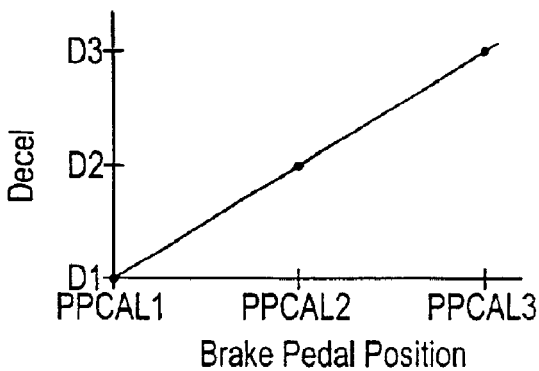
FIG. 3 is a graph depicting exemplary calibration brake effectiveness table data developed by the control unit of FIG. 1.

Typically, the "knee" portion of the relationship varies considerably from stop to stop, whereas the portion of the relationship above the knee tends to be linear and repeatable from stop to stop. For this reason, the knee portion of the relationship is ignored for purposes of characterizing braking effectiveness, and the brake pedal position vs. vehicle deceleration relationship is characterized only for pedal positions and vehicle decelerations in the linear portion above the knee. In the illustrated embodiment, for example, the data collection is carried out by determining the pedal position corresponding to three different vehicle deceleration values identified in FIG. 2 as D1, D2 and D3. Of course, any number of data points may be used, and the data points may be defined in terms of pedal position, if desired. In any case, the braking data is only collected during braking operation when the pedal 30 is depressed at a "normal" rate or held at an essentially static position; data is not collected upon release of the pedal 30 nor during panic braking. This eliminates the need to compensate for the effects of suspension and power train dynamics, tire and sensor dynamics, and so on. The vehicle acceleration at the onset of braking is saved and subtracted from the deceleration during braking operation in order to compensate for the effects of engine braking and road grade. Of course, the road grade and other factors such as vehicle weight and the effects of brake heating may be estimated and used to compensate the collected braking data; see for example, the U.S. Pat. No. 6,212,458 to Walenty et al., issued on Apr. 3, 2001, and incorporated herein by reference. FIG. 3 graphically depicts representative calibration table data for the vehicle 12, whereas FIG. 4 graphically depicts representative current table data. It will be noted that the pedal position values stored in the calibration table are identified as PPCAL1, PPCAL2 and PPCAL3, whereas the pedal position values stored in the current brake effectiveness table are identified as PPCUR1, PPCUR2 and PPCUR3.

Once the calibration and current data tables have been constructed, a series of diagnostic tests are carried out to identify degraded braking effectiveness and the likely cause. In general, the calibration table is used to define an expected vehicle deceleration for any brake pedal position above the minimum pedal position table entry. When the actual vehicle deceleration (compensated for grade, weight, etc.) is much lower than the expected value, hydraulic leaking, brake fading or air in the brake lines is indicated. Of these conditions, an estimate of brake heating is used to distinguish brake fading from hydraulic leaks and air in the hydraulic brake lines. Non-adjustment of the rear brakes 18, 20 is detected by computing a speed difference SPD_DELTA between the front and rear wheels and comparing it to a pedal position dependent threshold. If the speed difference exceeds the threshold by a calibration amount for at least a predefined time interval, poor adjustment of the rear brakes 18, 20 is indicated. Additionally, brake wear is detected by comparing the brake pedal positions in the current table with the corresponding pedal positions in the calibration table.

The flow diagram of FIGS. 5–8 depicts a first software routine that is periodically executed by control unit 50 of FIG. 1 for identifying the above-mentioned brake system degradation factors. In general, the flow diagram comprises an input processing block 90, a leak/fade detection portion consisting of blocks 96–116, a data collection portion consisting of blocks 120–126 and 150–174, a rear brake adjustment test consisting of blocks 130–146, a brake wear test consisting of blocks 180–216, and a condition warning portion consisting of blocks 218–220.

Figure 5:
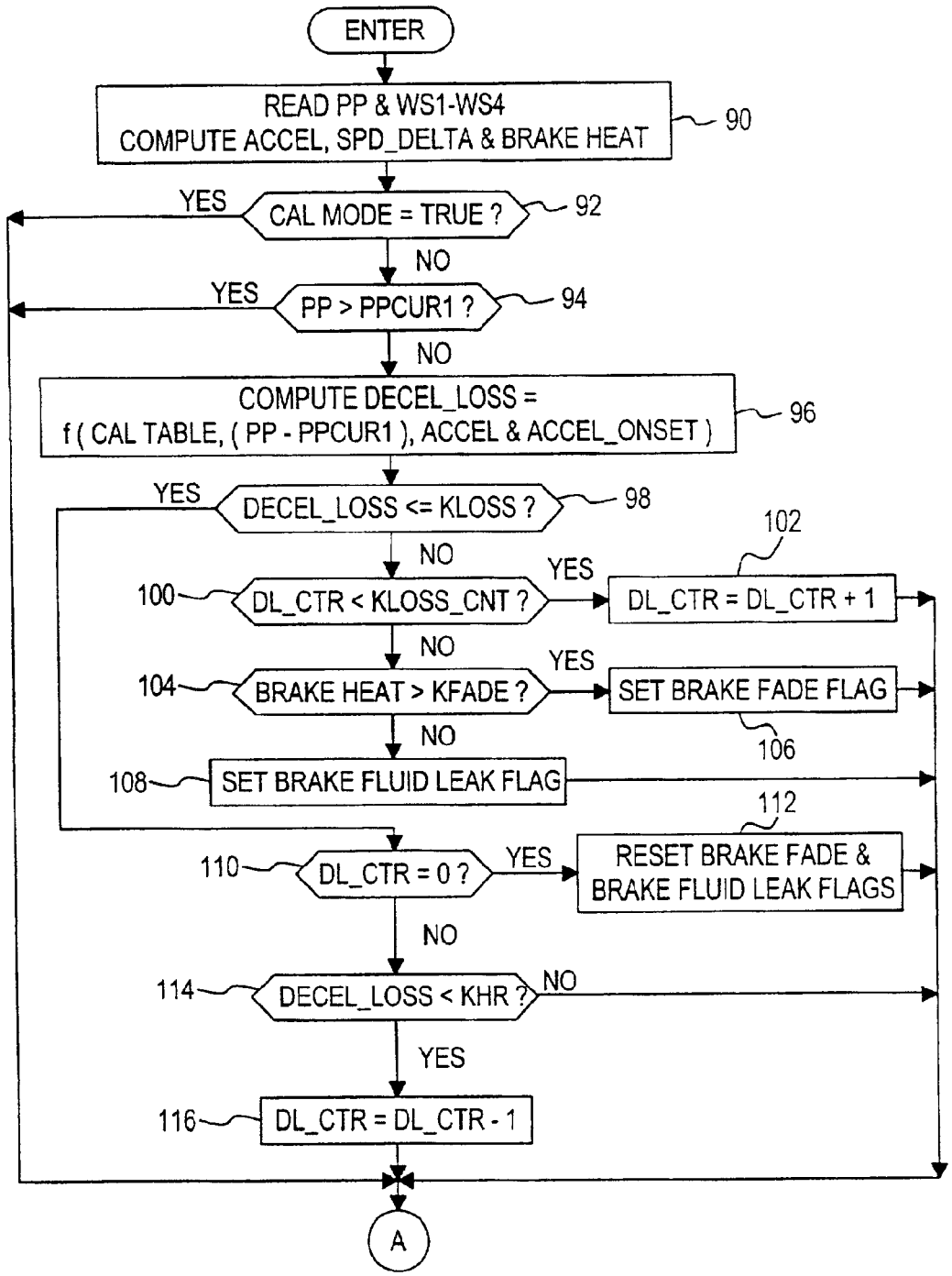
FIGS. 5, 6, 7 and 8 together depict a flow diagram of a first software routine executed by the control unit of FIG. 1 for identifying factors that degrade the braking system effectiveness.

Referring to FIG. 5, the input processing block 90 is first executed to read the brake pedal position PP and the wheel speeds, to compute the vehicle acceleration ACCEL (compensated for road grade and vehicle weight) and the front-to-rear speed delta SPD_DELTA, and to update an estimate of the brake temperature BRAKE_HEAT. Also, the vehicle acceleration when the brake pedal is initially depressed is saved as the onset acceleration ACCEL_ONSET, and a number of other brake-related parameters such as road grade, vehicle weight and the brake heat may be estimated as described, for example, in the aforementioned U.S. Pat. No. 6,212,458 to Walenty et al. The brake temperature term BRAKE_HEAT can be modeled reasonably well, and is updated as follows:

$$\text{BRAKE\_HEAT} = \text{BRAKE\_HEAT} - ((\text{VSPD}+K1)^2 * K2) * (\text{BRAKE\_HEAT} - (\text{BRAKE\_HEAT}*\text{Tamb}) + (\text{BRAKE\_TQ}*\text{Kheat}*\text{VSPD}) * (K3-\text{BRAKE\_HEAT})/K3 \quad (1)$$

where K1, K2 and K3 are constants, Tamb is the ambient temperature, and VSPD is the vehicle speed.

The block 92 determines if the calibration mode is in effect by checking the status of a CAL MODE FLAG. The CAL MODE FLAG is set to true to activate the calibration mode when the vehicle is new, and thereafter each time the braking system 10 is serviced. Thus, block 92 will initially be answered in the affirmative, signaling the execution of blocks 120–126, as indicated by the circled letter A, to determine if the braking condition is "normal" for purposes of brake data collection. Otherwise, the blocks 96–116 are executed to carry out the leak/fade detection test, provided that PP>PPCUR1, as determined at block 94.

Figure 6:
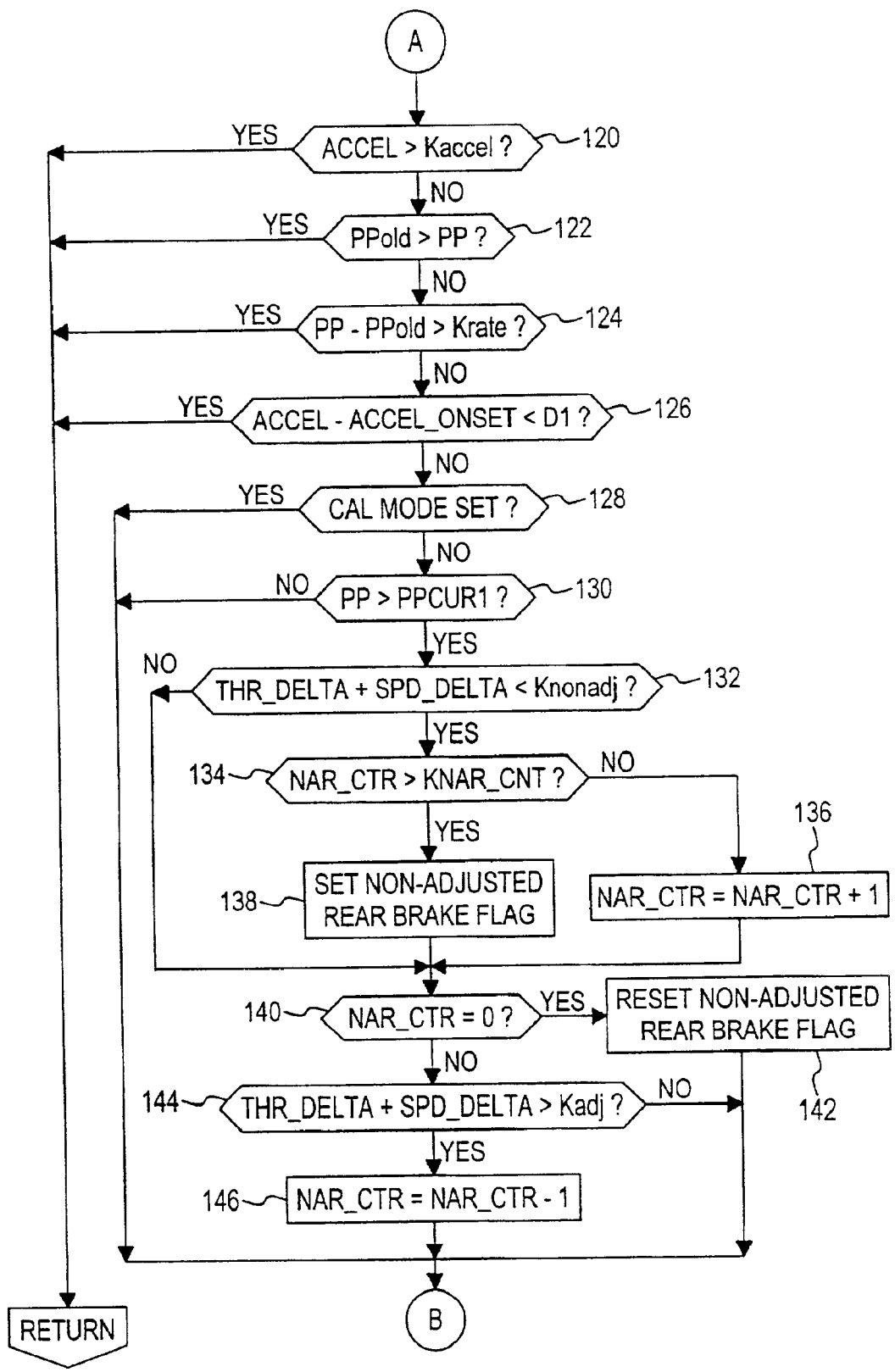
Figure 7:
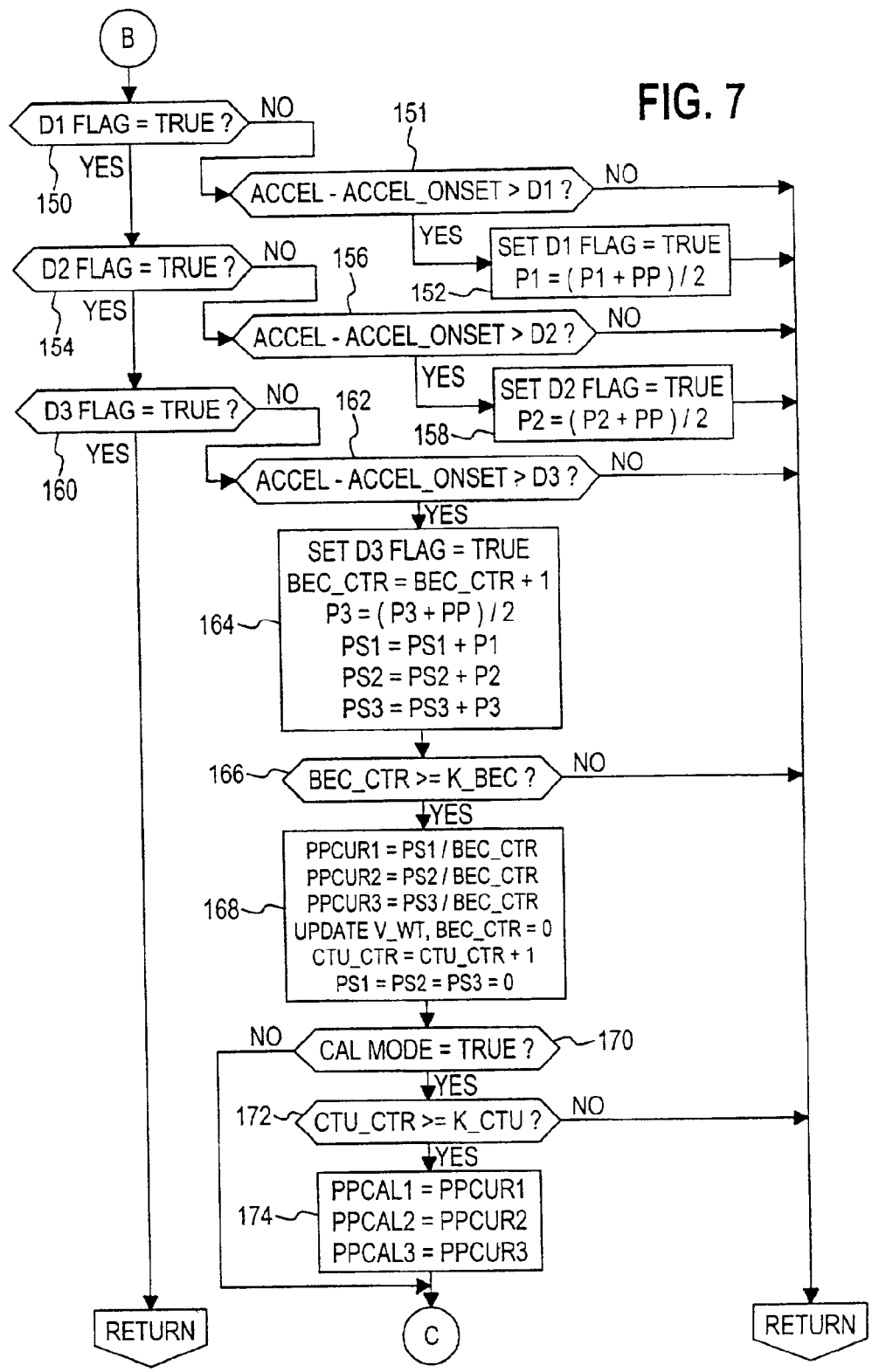
Figure 8:
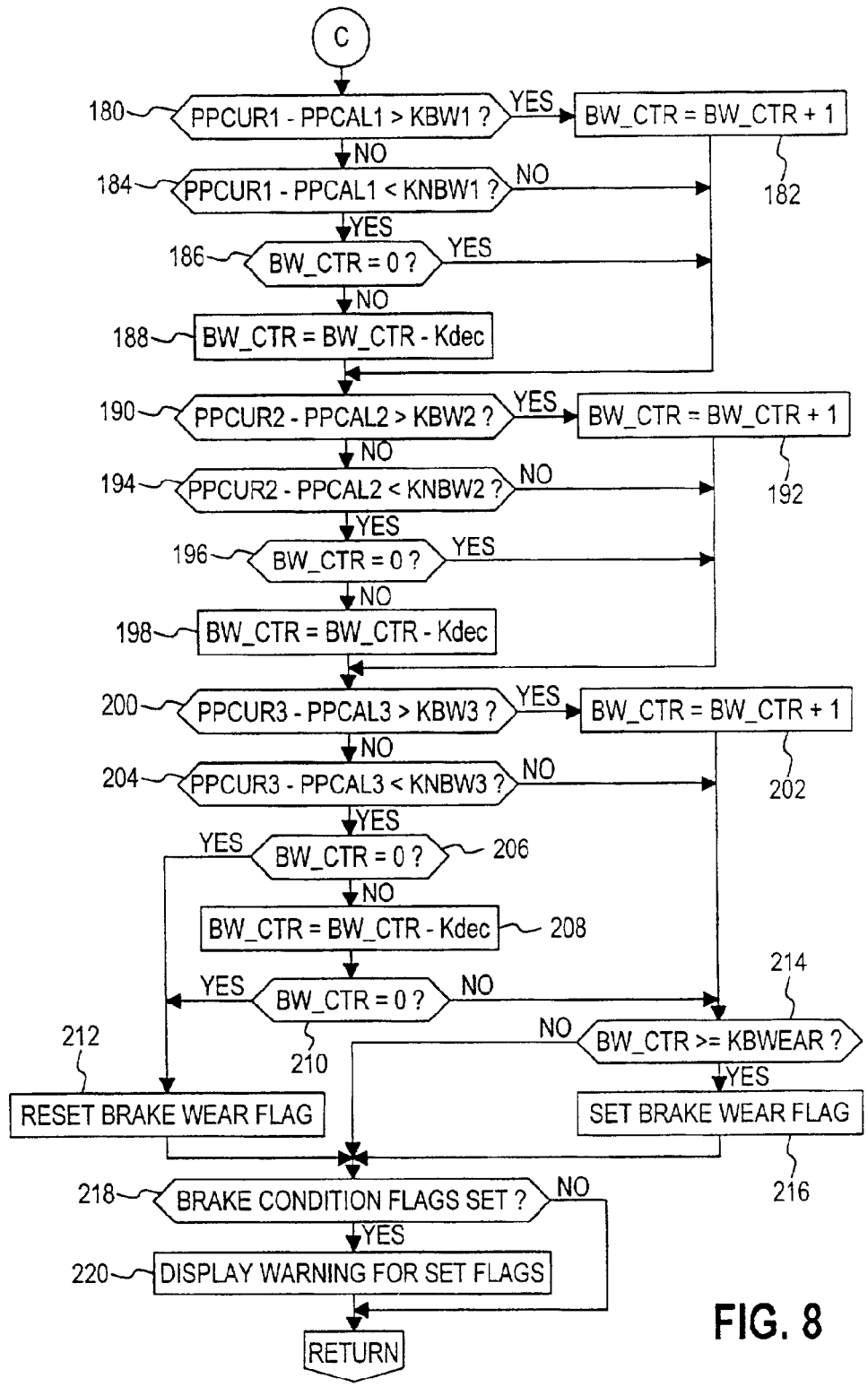

Referring to FIG. 6 and the data collection portion of the routine, the blocks 120–126 are first executed to determine if the current braking activity is suitable for data collection. Block 120 determines if ACCEL exceeds a relatively high threshold acceleration Kaccel, block 122 determines if the previous pedal position PPold is greater than the current value PP, block 124 determines if the difference (PP−PPold) exceeds a threshold rate Krate, and block 126 determines if the difference (ACCEL−ACCEL_ONSET) is less than the minimum deceleration table entry D1. Each of the blocks 120, 122, 124 and 126 must be answered in the negative to proceed with data collection; thus, a "normal" braking condition is defined as one in which (1) ACCEL<Kaccel, (2) PPold<PP, (3) PP−PPold<Krate, and (4) ACCEL−ACCEL_ONSET>D1. Stated oppositely, "normal" braking for purposes of data collection does not include (1) panic braking, (2) high rate brake pedal movement, (3) brake pedal releasing, or (4) deceleration below the linear range of the deceleration vs. pedal position relationship. If at least one of the blocks 120–126 is answered in the affirmative, the routine is exited, as indicated. If all are answered in the negative, the current braking activity is considered to be suitable for data collection, and if block 128 determines that the CAL MODE FLAG is true, the control unit proceeds to block 150, as indicated by the circled letter B. Otherwise, the blocks 132–146 are executed to carry out the rear brake adjustment test, provided that PP>PPCUR1, as determined at block 130.

Figure 4:
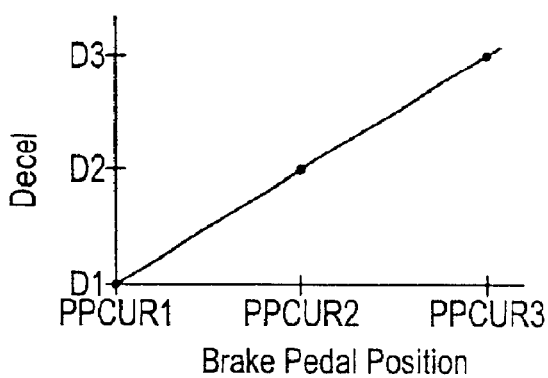
FIG. 4 is a graph depicting exemplary current brake effectiveness table data developed by the control unit of FIG. 1.

The data collection blocks 150–174 identify the brake pedal positions P1, P2, P3 corresponding to the respective predefined vehicle deceleration values D1, D2, D3, and construct current and calibration tables corresponding to those depicted in FIGS. 3 and 4. The blocks 150, 154 and 160 respectively determine if the pedal positions P1, P2 and P3 have been identified, based on the status of the D1 FLAG, the D2 FLAG and the D3 FLAG. If block 150 determines that the D1 FLAG is not true, the block 151 determines if the difference (ACCEL−ACCEL_ONSET) has reached the predefined deceleration value identified in FIG. 3 as D1. If not, the routine is exited; if so, the block 152 sets the D1 FLAG to true, and uses the current value of PP to update the pedal position variable P1 as shown. On the next execution of the routine, block 150 will be answered in the affirmative, and block 154 will determine if the D2 FLAG is true. If not, the block 156 determines if the difference (ACCEL−ACCEL_ONSET) has reached the predefined deceleration value identified in FIG. 3 as D2. If not, the routine is exited; if so, the block 158 sets the D2 FLAG to true, and uses the current value of PP to update the pedal position variable P2 as shown. On the next execution of the routine, blocks 150 and 154 will both be answered in the affirmative, and block 160 will determine if the D3 FLAG is true. If not, the block 162 determines if the difference (ACCEL−ACCEL_ONSET) has reached the predefined deceleration value identified in FIG. 3 as D3. If not, the routine is exited; if so, the block 164 sets the D3 FLAG to true, uses the current value of PP to update the pedal position variable P3, increments a brake event counter BEC_CTR, and sums the pedal position variables P1, P2 and P3 with corresponding position summation values PS1, PS2 and PS3. However, if the difference (ACCEL−ACCEL_ONSET) for the braking event fails to reach the deceleration value D3, the block 164 is not executed, and any pedal position data collected is discarded. After each successful data collection, the block 166 compares the brake event counter BEC_CTR to a calibrated threshold K_BEC indicative of the number of braking events needed to construct a current deceleration vs. pedal position table. Thus, when BEC_CTR reaches K_BEC, the identified pedal position variables P1, P2, P3 for K_BEC (which may have a value of ten, for example) braking events will have been accumulated in the respective position summation values PS1, PS2, PS3. When this happens, the block 168 is executed to calculate average pedal position values by dividing the respective position summation values PS1, PS2, PS3 by the brake event counter BEC_CTR, and to update the current deceleration vs. pedal position table using the calculated values. In other words, PPCUR1=PS1/BEC_CTR, PPCUR2=PS2/BEC_CTR and PPCUR3=PS3/BEC_CTR. Since changes in the vehicle weight change the current characterization table data, the vehicle weight is also updated according to:

$$V\_WT = V\_WT(last) + WT\_DELTA \quad (2)$$

where WT_DELTA is a measure of the change in characterization data, compensated for changes in brake temperature. Specifically, WT_DELTA is given by the expression:

$$WT\_DELTA = [((((PPCUR3old - PPCUR1old) - (PPCUR3 - PPCUR1))/(D3-D1))*Kwt] + (UPDATE\_BRAKE\_HEAT - BRAKE\_HEAT)*Kheat \quad (3)$$

where Kwt and Kheat are constants, PPCUR1old and PPCUR3old are old table values, and UPDATE_BRAKE_HEAT is the value of BRAKE_HEAT when the characterization table was previously updated. Block 168 also resets the brake event counter BEC_CTR and the position summation values PS1, PS2, PS3 to zero, and increments a current table update counter CTU_CTR. If the CAL MODE FLAG is set, as determined at block 170, the block 172 compares the current table update counter CTU_CTR to a calibrated threshold K_CTU (which may have a value of fifty, for example), where the product (K_BEC*K_CTU) is the number of braking events needed to construct the calibration deceleration vs. pedal position table. Thus, when block 172 is answered in the affirmative, the block 174 is executed to transfer the pedal position values of the current deceleration vs. pedal position table into the calibration pedal position table, to set the CAL MODE FLAG to false, and to reset the current table update counter CTU_CTR to zero. Once the CAL MODE FLAG has been set to false, the data collection blocks 150–168 will continue to be executed for the purpose of periodically updating the current deceleration vs. pedal position table, after which block 170 will be answered in the negative, enabling execution of the brake wear test portion of the routine (blocks 180–216).

The leak/fade test portion of the routine (blocks 96–116) is initialized at block 96 by computing a deceleration loss term DECEL_LOSS based on the current pedal position PP, the calibration deceleration vs. pedal position table, ACCEL_ONSET, and ACCEL. The amount by which PP exceeds PPCUR1 is used to determine an expected vehicle deceleration from the calibration table, which should be essentially equal to the difference (ACCEL−ACCEL_ONSET) when the braking effectiveness is unimpaired. However, when the braking effectiveness is impaired, the expected vehicle deceleration will be greater than (ACCEL−ACCEL_ONSET), so that DECEL_LOSS provides a measure of braking degradation. If DECEL_LOSS exceeds a threshold KLOSS, as determined at block 98, the blocks 100 and 102 increment a deceleration loss counter DL_CTR unless the count has reached a calibrated threshold KLOSS_CNT. Once DL_CTR reaches KLOSS_CNT—that is, once DECEL_LOSS has exceeded KLOSS for a calibrated time—block 100 is answered in the negative, and blocks 104–108 are executed to determine if the impaired braking effectiveness is due to a hydraulic leak or brake fading. If the estimated brake heat exceeds a calibrated value KFADE (corresponding to a brake temperature of 500 degrees C., for example), as determined at block 104, the block 106 is executed to set a BRAKE FADE FLAG. Otherwise, the block 108 is executed to set a BRAKE FLUID LEAK FLAG. If DECEL_LOSS is less than or equal to KLOSS, and DL_CTR is zero, the block 112 resets the BRAKE FADE FLAG and the BRAKE FLUID LEAK FLAG. If DL_CTR is greater than zero, and DECEL_LOSS is less than a calibrated threshold KHR which is lower than KLOSS, the block 116 decrements DL_CTR. Thus, if the deceleration due to braking is less than the expected deceleration by at least a predefined amount (KLOSS) for at least a predefined time (defined by KLOSS_CNT), the BRAKE FADE FLAG or the BRAKE FLUID LEAK FLAG is set to indicate the respective brake system failure.

The rear brake adjustment test portion of the routine (blocks 132–146) involves comparing the front-to-rear speed delta SPD_DELTA to pedal position dependent threshold THR_DELTA, defined as (PP−PPCUR1)* Kgain, where Kgain is a predefined gain factor. As either or both of the rear wheel brakes 18, 20 go out of adjustment, SPD_DELTA will become more and more negative, and when the sum of SPD_DELTA and THR_DELTA falls below a threshold Knonadj, as determined at block 132, the blocks 134 and 136 increment a non-adjusting rear counter NAR_CTR unless the count has reached a calibrated threshold KNAR_CNT. Once NAR_CTR reaches KNAR_CNT—that is, the sum of SPD_DELTA and THR_DELTA falls below a threshold Knonadj for a calibrated time—block 134 is answered in the affirmative, and blocks 138 is executed to set the NON_ADJUSTED REAR BRAKE FLAG. The block 146 decrements NAR_CTR whenever when the sum of SPD_DELTA and THR_DELTA exceeds the threshold Kadj, and the blocks 140–142 reset the NON_ADJUSTED REAR BRAKE FLAG when NAR_CTR is zero.

The brake wear test portion of the routine (blocks 180–216) essentially determines if the brake pedal 30 must be depressed further than normal to achieve a given vehicle deceleration by comparing the pedal positions of the just-constructed current deceleration vs. pedal position table with the corresponding pedal positions from the calibration table. If the pedal position values from the current table exceed the corresponding values from the calibration table by pre-defined calibration amounts, a brake wear counter BW_CTR is incremented. Thus, blocks 180–182 increment BW_CTR if (PPCUR1−PPCAL1)>KBW1, blocks 190–192 increment BW_CTR if (PPCUR2−PPCAL2)>KBW2, and blocks 200–202 increment BW_CTR if (PPCUR3−PPCAL3)>KBW3, where KBW1, KBW2 and KBW3 are the predefined calibration amounts. If the pedal position values from the current table are within a calibration amount of the pedal position values from the current table, the brake wear counter BW_CTR is decremented by Kdec if BW_CTR is not already zero. Thus, blocks 184, 186, 188 decrement BW_CTR toward zero if (PPCUR1−PPCAL1)<KNBW1, blocks 194, 196, 198 decrement BW_CTR toward zero if (PPCUR2−PPCAL2)<KNBW2, and blocks 204, 206, 208 decrement BW_CTR toward zero if (PPCUR3−PPCAL3)<KNBW3, where KNBW1, KNBW2 and KNBW3 are calibration amounts indicative of no brake wear. If the execution of blocks 180–208 results in a BW_CTR value of zero, as determined at blocks 206 and 210, the block 212 is executed to reset the BRAKE WEAR FLAG. On the other hand, if bloc 214 determines that BW_CTR exceeds a threshold KBWEAR, the block 216 sets the BRAKE WEAR FLAG.

Finally, the blocks 218 and 220 are executed to check the brake condition flags, and to display messages corresponding to set flags on the driver information device 82, and to initiate other responses such as an aggressive downshift schedule that supplements the vehicle deceleration due to application of the service brakes.

Figure 9:
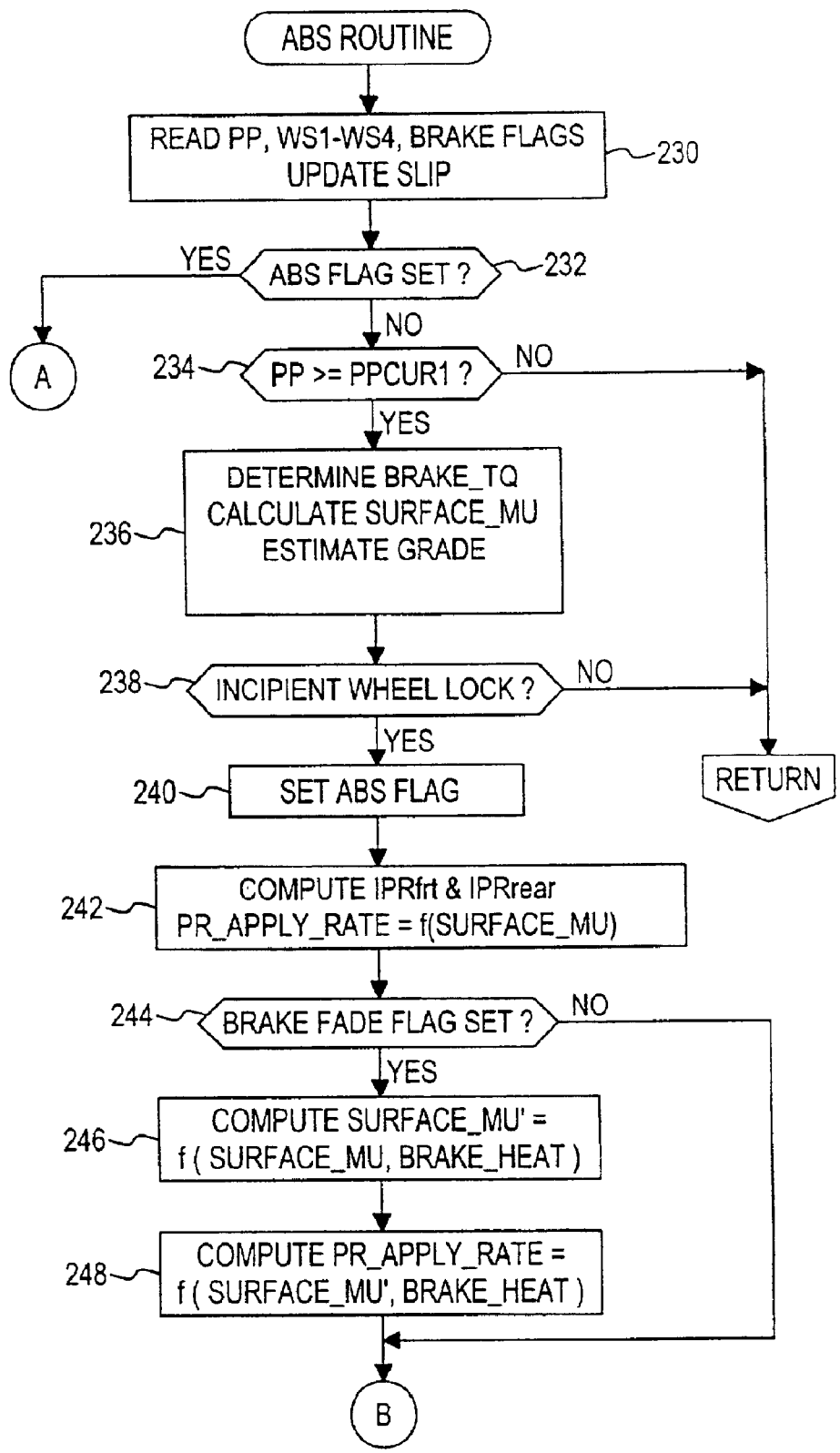
FIGS. 9 and 10 together depict a flow diagram of a second software routine executed by the control unit of FIG. 1 for adaptively adjusting the brake apply rate during anti-lock brake control based on the factors identified by the routine of FIGS. 5, 6, 7 and 8.
Figure 10:
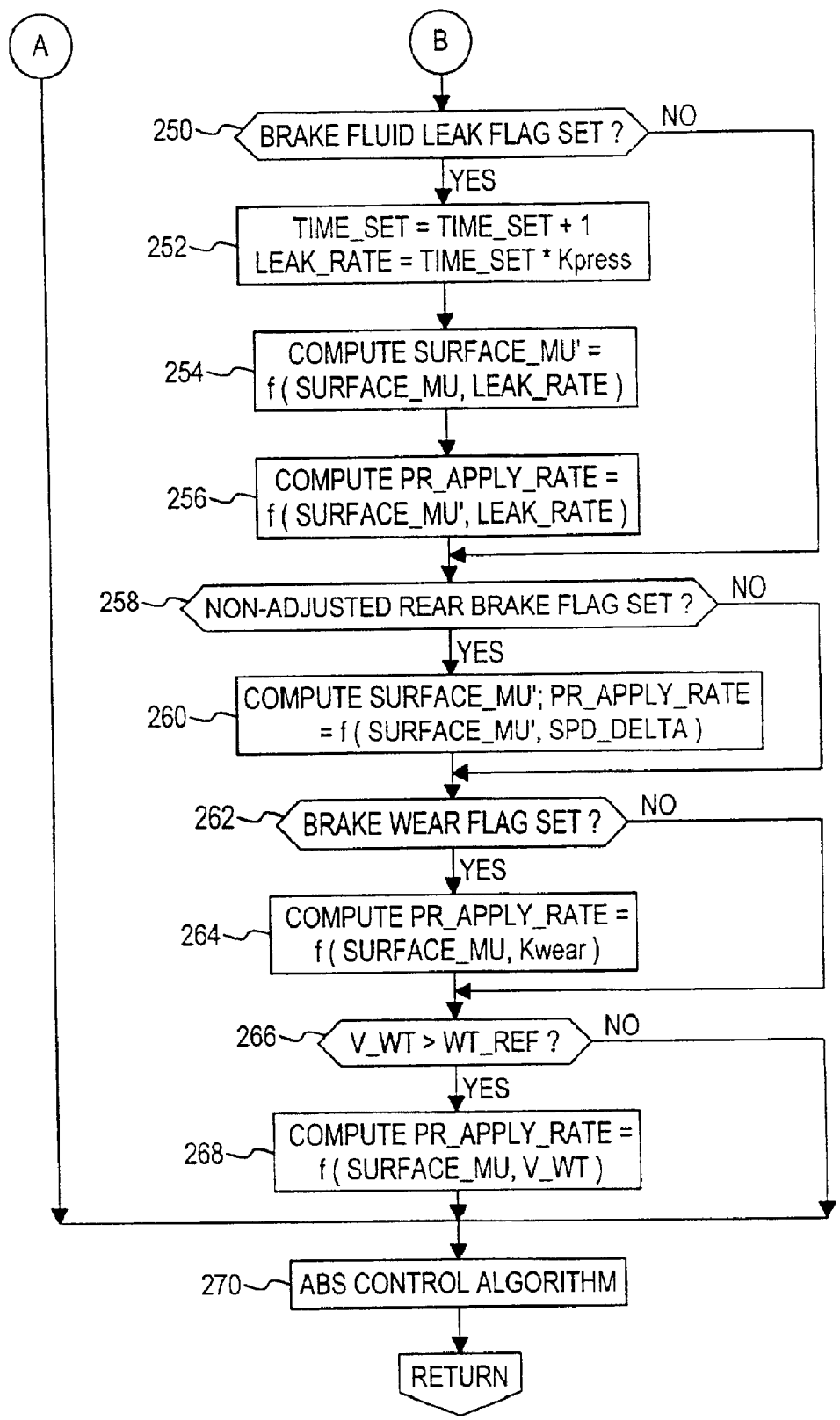

The flow diagram of FIGS. 9–10 depicts an ABS control routine that is periodically executed by the controller 50 of FIG. 1, and that is responsive to the brake system flags and other parameters developed in the flow diagram of FIGS. 5–8. Referring to FIG. 9, the block 230 is first executed to read the brake pedal position PP, the wheel speeds WS1–WS4, and the brake flags, and to update the wheel slip values (SLIP). Block 232 then checks the ABS FLAG to determine if anti-lock braking is active. If insipient wheel lock has already been detected, and the modulators 38, 40, 42 have been activated to modulate the brake pressure, the ABS FLAG will be TRUE; in this case, the block 270 of FIG. 10 is executed for carrying out the ABS control algorithm for repeatedly releasing and re-applying brake pressure to maximize braking tractive force. Ordinarily, however, the ABS FLAG is FALSE, and if the pedal position PP exceeds the lowest position PPCUR1 of the current brake characterization table (as determined at block 234), the block 236 is executed to determine the braking torque BRAKE_TQ, the road surface coefficient of friction SURFACE$_{13}$MU, and the road grade GRADE. The brake torque BRAKE_TQ is estimated based on the pedal position PP and the current brake characterization table values as follows:

$$\text{BRAKE\_TQ} = [((PP-PPCUR1)*(PPCUR3-PPCUR1)/(D3-D1))*Kbt] + (UPDATE\_BRAKE\_HEAT - BRAKE\_HEAT)*Kheat \quad (4)$$

where Kbt and Kheat are constants, and UPDATE_BRAKE_HEAT is the estimated brake temperature BRAKE_HEAT when the characterization table was last updated. The road surface coefficient of friction SURFACE_MU is given by:

$$\text{SURFACE\_MU} = (BRAKE\_TQ/V\_WT)*Kmu \quad (5)$$

where Kmu is a constant. Finally, the road grade (GRADE) is estimated according to the expression:

$$\text{GRADE} = ROLL\_RES + AERO\_DRAG + ENG\_BR + BRAKE\_TQ + ACCEL \quad (6)$$

where ROLL_RES is the rolling resistance, AERO_DRAG is the aerodynamic drag, ENG_BR is the engine braking torque, and ACCEL is the vehicle acceleration.

If incipient wheel lock is detected, as determined at block 238, the block 240 sets the ABS FLAG, and the block 242 computes initial brake pressure release values IPRfrt, IPRrear for the front and rear wheels as follows:

$$IPRfrt = PRmax\_f*(1-SURFACE\_MU-(GRADE*Kwt\_tr\_f)) \quad (7)$$

$$IPRrear = PRmax\_r*(1-SURFACE\_MU-(GRADE*Kwt\_tr\_r)) \quad (8)$$

where PRmax_f and PRmax_r are the maximum front and rear initial release pressures, and Kwt_tr_f and Kwt_tr_r are front and rear weight transfer constants. Additionally, a normal value of the brake pressure apply rate PR_APPLY_RATE for ABS control is computed as a function of SURAFACE_MU.

If the BRAKE FADE FLAG is set, as determined at block 244, the degraded braking biases the term SURFACE_MU to an artificially low value, and block 246 computes a corrected coefficient of friction SURFACE_MU' as follows:

$$\text{SURFACE\_MU}' = SURFACE\_MU - [(Knbh - BRAKE\_HEAT)*Kheat] \quad (9)$$

where Knbh is a nominal brake heat value, and Kheat is a normalizing constant. The brake pressure apply rate PR_APPLY_RATE is normally proportional to SURFACE_MU as mentioned in reference to block 242, but in the case of brake fading, PR_APPLY_RATE must be increased to develop the desired brake torque. Thus, block 248 re-computes the brake pressure apply rate PR_APPLY_RATE based on the amount of detected fading, as follows:

$$PR\_APPLY\_RATE = SURFACE\_MU'*[(Knbh - BRAKE\_HEAT)*Kfade] \quad (10)$$

where Kfade is a normalizing constant. Although increasing PR_APPLY_RATE may increase the fading, it will also increase the braking effectiveness, allowing the vehicle to stop as soon as possible.

If the BRAKE FLUID LEAK FLAG is set, as determined at block 250, the blocks 252, 254 and 256 are executed to estimate the extent of the leak, to revise SURFACE_MU, and to compute a PR_APPLY_RATE value that will compensate for the detected leakage. Block 252 estimates the extent of the leak by incrementing a counter value TIME_SET and computing a LEAK_RATE term according to the product of TIME_SET and a pressure constant Kpress. As with brake fading, fluid leakage causes the road coefficient of friction term SURFACE_MU computed at block 236 to be too low, and block 254 computes a corrected coefficient of friction SURFACE_MU' as follows:

$$\text{SURFACE\_MU}' = SURFACE\_MU - (LEAK\_RATE*Kleak) \quad (11)$$

where Kleak is a normalizing constant. The brake pressure apply rate PR_APPLY_RATE is normally proportional to SURFACE_MU, but in the case of fluid leakage, PR_APPLY_RATE must be increased to develop the desired brake torque. Thus, block 256 re-computes the brake pressure apply rate PR_APPLY_RATE based on the amount of detected fluid leakage, as follows:

$$PR\_APPLY\_RATE = SURFACE\_MU' * (LEAK\_RATE * Kramp)\quad(12)$$

where Kramp is a normalizing constant. Although increasing PR_APPLY_RATE may increase the fluid leakage, it will also increase the braking effectiveness, allowing the vehicle to stop as soon as possible.

If the NON-ADJUSTED REAR BRAKE FLAG is set, as determined at block 258, the block 260 is executed to revise SURFACE_MU, and to compute a PR_APPLY_RATE value for the respective rear brake that will compensate for the misadjustment. Specifically, the corrected coefficient of friction SURFACE_MU' and PR_APPLY_RATE are determined as follows:

$$SURFACE\_MU' = SURFACE\_MU - (SPD\_DELTA * Knar)\quad(13)$$

$$PR\_APPLY\_RATE = SURFACE\_MU' * (SPD\_DELTA * Knar)\quad(14)$$

where SPD_DELTA is the front-to-rear speed delta determined at block 90 of FIG. 5, and Knar is a normalizing constant.

Another possible rear brake problem is a non-releasing rear brake shoe. If this condition is detected, the pressure apply rate may be increased on the opposite rear brake, or both rear brakes may be released during ABS operation. The non-releasing rear brake influences the calculated front-to-rear speed delta SPD_DELTA, and if the pressure apply rate is increased on the opposite rear brake, the apply rate may be computed essentially as explained above in respect to the non-adjusted rear brake condition, only with a different normalizing constant.

If the BRAKE WEAR flag is set, as determined at block 262, the block 264 is executed to increase the PR_APPLY_RATE value to compensate for the brake wear. Specifically, PR_APPLY_RATE is determined as follows:

$$PR\_APPLY\_RATE = SURFACE\_MU * Kwear\quad(15)$$

where Kwear is a predetermined constant.

Finally, if the determined vehicle weight V_WT exceeds a reference weight WT_REF, as determined at block 266, block 268 is executed to augment the pressure apply rate PR_APPLY_RATE as follows:

$$PR\_APPLY\_RATE = SURFACE\_MU * (V\_WT - Klvw) * Kwt\quad(16)$$

where Klvw is the normally loaded vehicle weight, and Kwt is a gain constant.

In summary, the control of this invention adjusts anti-lock brake control parameters to adaptively compensate for identified brake degradation factors, such as fading, fluid leakage, brake wear, and excessive vehicle weight. While described in reference to the illustrated embodiment, it is expected that various modifications in addition to those mentioned above will occur to those skilled in the art. For example, the control is applicable to other types of anti-lock brake systems, and other types of vehicles, including electric or hybrid-electric vehicles that utilize regenerative braking to decelerate the vehicle. Also, the control methodology may include logic for selecting the desired pressure apply rate if two or more of the brake diagnostic flags are set. Thus, it will be understood that the scope of this invention is not limited to the illustrated embodiment, and that diagnostic methods incorporating these and other modifications may fall within the scope of this invention, which is defined by the appended claims.

What is claimed is:

1. A method of operation for a vehicle braking system including a driver activated brake pedal, a hydraulic brake pressure modulator, and an anti-lock brake control that activates the brake pressure modulator to modulate vehicle braking upon detection of an insipient wheel lock condition, the method comprising the steps of:

periodically measuring vehicle deceleration and a brake pedal position during activation of the braking system when said insipient wheel lock condition is not detected;

identifying conditions of degraded braking effectiveness based on the periodically measured deceleration and brake pedal position;

adaptively adjusting a brake hydraulic pressure control parameter of said anti-lock brake control when a condition of degraded braking effectiveness is identified so as to compensate for the identified condition; and wherein the condition of degraded braking effectiveness is determined by computing a rear speed difference between at least one front tire and at least one rear tire and comparing it to a pedal position dependent threshold value.

2. The method of claim 1, wherein the anti-lock brake control releases and then re-applies brake pressure at a determined apply rate upon detection of an insipient wheel lock condition, and the step of adaptively adjusting a brake control parameter includes adjusting the determined apply rate in a manner to provide an increased rate of brake pressure application.

3. The method of claim 1, wherein the identified condition of degraded braking effectiveness further comprises excessive vehicle weight, and the measure of braking effectiveness degradation is determined according to an amount by which an estimate of vehicle weight exceeds a reference weight.

4. The method of claim 1, wherein the identified condition of degraded braking effectiveness further comprises fluid leakage, and the measure of braking effectiveness degradation is determined according to an estimated rate of the fluid leakage.

5. The method of claim 1, wherein the step of adaptively adjusting a brake hydraulic pressure control parameter includes the steps of:

compensating the estimated road surface coefficient of friction for error due to the identified condition of degraded braking effectiveness; and determining a brake apply rate based on the compensated estimate of road surface coefficient of friction and the measure of braking effectiveness degradation.

6. The method of claim 1, wherein the anti-lock brake control releases and then re-applies brake pressure at a determined apply rate upon detection of an insipient wheel lock condition, the method further including the steps of:

estimating a road surface coefficient of friction based on the periodically measured deceleration and brake pedal position;

determining said apply rate based on the estimated road coefficient of friction when conditions of degraded braking effectiveness are not identified; and determining said apply rate based on the estimated road coefficient of friction and a measure of braking effectiveness degradation when the condition of degraded braking effectiveness is identified.

\* \* \* \* \*